Aug. 23, 1932.    O. W. JOHNSON    1,873,594
WATER SOFTENER
Filed Oct. 1, 1927
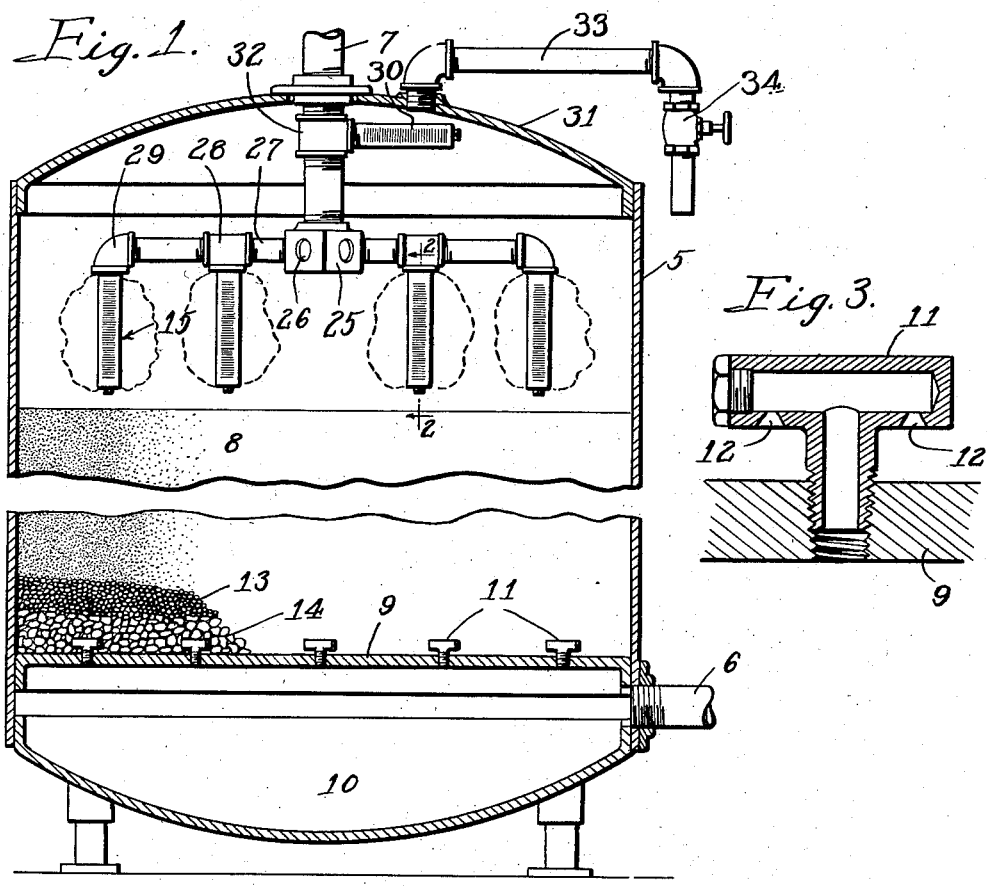
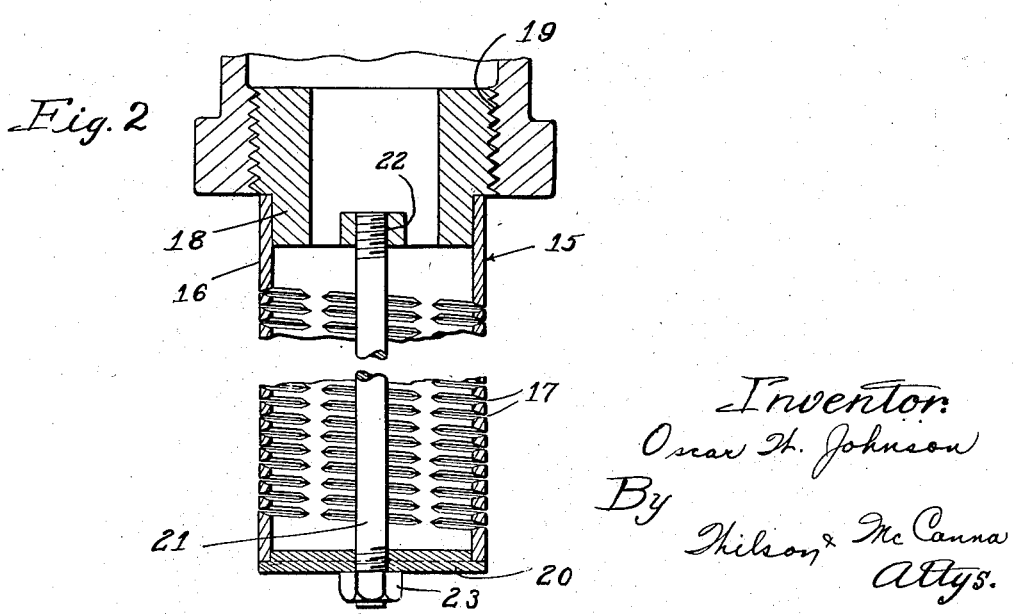
Inventor:
Oscar W. Johnson
By Wilson & McCanna
Attys.

Patented Aug. 23, 1932

1,873,594

UNITED STATES PATENT OFFICE

OSCAR W. JOHNSON, OF ROCKFORD, ILLINOIS, ASSIGNOR TO WARD-LOVE PUMP CORPORATION, OF ROCKFORD, ILLINOIS, A CORPORATION OF ILLINOIS

WATER SOFTENER

Application filed October 1, 1927. Serial No. 223,297.

This invention relates to water softeners.

The principal object of my invention is to provide improved strainers capable of general application to water softeners, which are ideal for the purposes contemplated for the reason that they positively prevent the escape of mineral therethrough and, at the same time, do not present serious restriction to the passage of water.

Another important object, having more particular reference to large units, such as industrial softeners, where a group of strainers have to be employed in order properly to handle the volume of water and also take care of the distribution of the water flow as uniformly as possible throughout the cross-sectional area of the bed, consists in so arranging the strainers above the bed that the washing back and forth of the mineral onto and about the strainers in the normal operation of the softener will result in the cleaning off of the strainers and there will be little or no likelihood of the same becoming clogged even when in continuous service for comparatively long periods of time.

A still further object having special reference to industrial units is the provision of one or more strainers of the present type for the special purpose of serving as air leaks or drains in order to relieve the softener tank of any air pockets which may be formed therein during regeneration.

The invention is illustrated in the accompanying drawing, wherein—

Figure 1 is a vertical section through a softener equipped with my improved strainers;

Fig. 2 is an enlarged vertical section through one of the strainers taken on the line 2—2 of Fig. 1; and Fig. 3 is an enlarged vertical section through one of the strainer nozzles used beneath the bed.

The softener in connection with which the present invention is disclosed comprises the usual tank 5 having pipe connections 6 and 7 communicating with the bottom and top respectively, the connection 6 in upflow operation being the inlet for the hard water and the connection 7 being the outlet for softened water. The tank contains a bed 8 of zeolite mineral or other water softening material supported on a plate 9 above the sediment chamber 10. The plate 9, as described in a copending application, Serial No. 222,554, filed September 28, 1927, is equipped with a multiplicity of strainer nozzles 11 for distributing the incoming hard water substantially uniformly throughout the cross-sectional area of the bed for contact with the mineral, the said nozzles having discharge openings 12 on the nether side of the branches thereof, as disclosed in Fig. 3, whereby the water discharged therefrom strikes the plate 9 and is thereby distributed substantially uniformly in all directions. The uniform distribution is, furthermore, insured as a result of the outward flaring of the openings 12, as described in said application, the outward flaring being also of advantage in that particles which may become lodged therein during a reverse flow in regeneration are quite readily dislodged by the water discharged through the openings during normal operation as also set forth in said application. The mineral of the bed 8 is relatively fine and for that reason is supported on a layer 13 of quartz of medium coarseness and another layer 14 of gravel or other coarser material. As will presently appear, my invention is particularly concerned with the provision of strainers of such a character that mineral of a much finer texture can be employed, thus giving greater capacity for a given sized unit and generally increased efficiency. At the same time, the use of the strainers as hereinafter more particularly set forth enables the cutting down in height of the softener without diminishing its capacity or interfering with its efficient operation.

The strainers of my invention are designated generally by the reference numerals 15 and, as disclosed in Fig. 2, are each composed of a tube 16 of brass or other suitable non-corrosive metal having a multiplicity of strainer slots 17 provided in the walls thereof, the slots being extremely fine so as positively to prevent the passage therethrough of even the finest particles of the mineral bed but being tapered or flared in form, as illustrated, so that there is no serious restriction to the flow of water therethrough. The manner of forming the slots is relatively of no importance here although it might be well to point out that in the forming of the slots, a milling cutter operates inside the tube and almost, but not quite, pierces the wall and that following the milling the tube is serrated from the outside to complete the formation of the slots of almost a hair's breadth. The point of importance in the present case which may here be noted is that no burrs are left on the exposed outside surface of the tube. The tube, being absolutely smooth on its exterior, will not, therefore, tend to collect mineral thereon and is easily kept clean, especially when mounted in the special manner hereinafter described. The tube 16, in the case of each strainer, is fitted over the reduced end of a hollow plug 18 which is externally threaded, as indicated at 19, for the purpose of the mounting thereof for the support of the strainer in the softener. A cap 20 closes the outer end of the tube and a single bolt 21, threaded at 22, in the plug 18 and extending centrally through the tube and the cap serves to hold both the tube and its cap in assembled relation on the plug when the nut 23 is threaded in place on the projecting end of the bolt. The strainers are obviously so constructed that they may be easily assembled and disassembled.

The strainers are herein illustrated as employed above the mineral bed as outlets for the softened water, the direction of flow in the normal softening operation being upward. It will be apparent, however, that in a softener operating on the downflow principle strainers of the present type might also be employed to good advantage as inlets for hard water, and also that they might be employed beneath the bed instead of above the same regardless of whether the softener operated on the upflow or downflow principle. When employed above the bed in an upflow unit, as herein contemplated, a plurality of strainers are preferably provided and arranged in approximately uniformly distributed relation. For example, a header 25 is employed having openings 26 therein on various sides thereof, six in the present case, for branches 27 whereon the strainers are mounted as by means of T's 28 and elbows 29. Only two branches appear in the drawing on the six-way header, two branches being removed on the front side of the header so as to disclose the openings 26. It will be evident that any number of branches may be employed according to the size of the unit and likewise that any number of strainers may be carried on each of the various branches. The thought, in any event, is to distribute the strainers as evenly as possible so as to secure better distribution of the water flow through the mineral bed. In operation, whenever water is drawn mineral at the top of the bed rises and crowds about the strainers somewhat as indicated in dotted lines in Fig. 1. The moment the water is shut off, however, this mineral drops off the strainers and settles again into the bed. This back and forth washing of the mineral keeps the strainers scoured thoroughly clean. The vertical disposition of the strainers is obviously of advantage in that the full length of each strainer is exposed to the scouring action and all sides to the same extent.

I also prefer to provide an additional strainer 30 at or near the high point inside the dome 31 of the softener tank and in communication with the header 25 and connection 7 through the T 32. This strainer serves as an air leak or drain to relieve the tank of any otherwise objectionable air pockets which may be formed therein during regeneration. The elimination of these air pockets makes for smooth and noiseless operation.

In normal softening operation it will be evident that the incoming hard water is discharged through the openings 12 of the strainer nozzles 11 and is thereby distributed substantially uniformly throughout the cross-sectional area of the bed 8 for softening. The water after passage through the bed leaves the tank by way of the strainers 15 which positively prevent the escape of any of the mineral. Following a capacity run of softening operation when the softener is being regenerated it is common practice to pass brine through the bed in the reverse direction to liberate the lime and magnesium assumed by the mineral during softening. There is in this operation some slight likelihood of solid particles of salt or grit becoming lodged in the slots or interstices 17 of the strainers 15 and still greater likelihood of the lodging of gravel, quartz, or mineral particles in the openings 12 of the nozzles 11. However, immediately following the regeneration flow, in what is called the rinse or back wash, such particles as may have become lodged in the openings 12 and slots 17 will tend to be quite easily dislodged, particularly because of the fact that the openings 12 and slots 17 are both flared or tapered in the normal direction of the flow of the water, that is, both during the rinse and during the normal softening operation. In other words, there is a far greater tendency to dislodge particles from the openings 12 and slots 17 than there is to lodge particles therein, the rate of flow during regeneration being much slower than during the softening and rinse operations, and the regeneration flow being of much shorter duration than the softening operation.

It will be observed that I have provided a pipe connection at 33 communicating with the top of the tank suitably in the vicinity of the air leak strainer 30 and above the same. This pipe connection has communication with a waste pipe or may be lead directly to the sewer and has a valve 34 controlling the flow of the water therethrough. The purpose in providing this pipe connection is to enable flushing out silt, slime, or any foreign or deleterious material which may collect in the tank, the nature and extent of such deposits depending, of course, on the kind of water being softened. It will be evident that this filth outlet further insures the removal of any air which may not have been caused to bleed out through the strainer 30, thus keeping the tank absolutely free of air pockets.

I claim:

1. In a water softener, a tank containing a bed of water softening material, the bed having supporting and distributing means at the bottom thereof, inlet and outlet connections for the opposite ends of said tank providing for the passage of water or brine through the bed, and a header communicating with the connection at the top of the tank having a plurality of strainer elements communicating therewith and disposed in distributed relation above the bed of water softening material, the said strainer elements being disposed in a plane appreciably below the highest point in the tank and normally serving as outlets, and an air leak strainer element communicating with the header and disposed above the other strainer elements at or near the highest point in the tank.

2. In a water softener, a tank containing a bed of water softening material, the bed having supporting and distributing means at the bottom thereof, inlet and outlet connections for the opposite ends of said tank providing for the passage of water or brine through the bed, a header normally serving as an outlet communicating with the connection at the upper end of the tank, said header being disposed above the bed of water softening material and having a plurality of elongated strainer elements communicating therewith and disposed vertically in distributed relation and extending downwardly toward the bed of water softening material so that some material is caused to wash up and down lengthwise of each of said elements on each occasion that some water flows through the bed, and a strainer element arranged to serve as an air drain, said element being of elongated form and being mounted in a position above the other strainer elements nearer the top of the tank with its longitudinal axis substantially horizontal.

3. In a water softener, a tank containing a bed of water softening material, inlet and outlet connections for the opposite ends of said tank providing for the passage of water through the bed normally in one direction for softening but arranged to permit the passage of brine through the bed in a reverse direction during regeneration, and strainer elements at the inlet and outlet ends of the bed serving mainly as distributing means at the one end of the bed and as material retaining means at the other end during the normal softening flow, said strainer elements having the openings therein flared in the normal direction of water flow, the openings in the strainer elements at the inlet end of the tank being outwardly flared and the openings in the strainer elements at the outlet end of the bed being inwardly flared substantially as and for the purposes described.

4. In a water softener comprising a tank containing a bed of water softening material and having inlet and outlet connections for the opposite ends of the tank providing for the passage of water through the bed, a strainer communicating with one of said connections comprising a hollow plug arranged to serve as the support for said strainer, a tube having one end fitting on the plug and in open fluid communication therewith, a cap closing the other end of said tube, said tube having a multiplicity of strainer slots through the walls thereof, the slots being of such fineness to prevent the passage of minute solid particles therethrough and being flared in form so as to minimize the resistance to flow of the water therethrough, and a single bolt passing through a hole in the cap and through the tube and threaded in the plug, the tightening of said bolt serving to hold the cap in place on the tube and the tube in place on the plug.

5. In a water softener comprising a tank containing a bed of water softening material, inlet and outlet connections for the opposite ends of said tank providing for the passage of water through the bed, strainer elements for the upper end of said tank serving to retain the material in the tank while permitting the discharge of water therefrom, an air leak strainer element in communication with the other strainer elements at the upper end of the tank disposed in a plane above the other strainer elements nearer the top of the tank, and a waste outlet pipe connection at the very top of the tank arranged at intervals to withdraw foreign material from the tank, the exit of which is prevented by the strainer elements.

6. A structure as set forth in claim 5 wherein the waste outlet pipe connection is in the vicinity of the air leak strainer whereby the water discharging from the tank through said connection serves to clean off any deposits of foreign material on the air leak strainer element.

7. In a water softener comprising a tank containing a bed of water softening material and having inlet and outlet connections for the opposite ends of the tank providing for the passage of water through the bed, a strainer communicating with one of said connections comprising a hollow plug arranged to serve as the support for said strainer, a tube having one end fitting on the plug and in open fluid communication therewith, a cap closing the other end of said tube, said tube having a multiplicity of fine strainer slots through the walls thereof to prevent the passage of minute solid particles therethrough, and a single bolt passing through a hole in the cap and through the tube and threaded in the plug, the tightening of said bolt serving to hold the cap in place on the tube and the tube in place on the plug.

In witness of the foregoing I affix my signature.

OSCAR W. JOHNSON.